(12) United States Patent
Uke

(10) Patent No.: US 10,151,432 B1
(45) Date of Patent: Dec. 11, 2018

(54) FLASHLIGHT WITH BATTERY SEPERATOR TUBE

(71) Applicant: Alan Uke, Poway, CA (US)

(72) Inventor: Alan Uke, Poway, CA (US)

(*) Notice: Subject to any disclaimer, the term of this patent is extended or adjusted under 35 U.S.C. 154(b) by 0 days.

(21) Appl. No.: 15/621,334

(22) Filed: Jun. 13, 2017

(51) Int. Cl.
| F21L 4/04 | (2006.01) |
| F21L 4/00 | (2006.01) |
| F21L 2/00 | (2006.01) |
| F21V 23/04 | (2006.01) |
| H01M 2/10 | (2006.01) |

(52) U.S. Cl.
CPC .............. F21L 4/005 (2013.01); F21L 2/00 (2013.01); *F21V 23/0414* (2013.01); *H01M 2/1022* (2013.01)

(58) Field of Classification Search
CPC ......... F21L 4/005; F21L 2/00; F21V 23/0414; H01M 2/1022
See application file for complete search history.

(56) References Cited

U.S. PATENT DOCUMENTS

| 3,863,062 | A | * | 1/1975 | Caron | A45C 11/32 |
| | | | | | 362/116 |
| 5,353,208 | A | * | 10/1994 | Moore | F21L 4/005 |
| | | | | | 362/202 |
| 6,158,875 | A | * | 12/2000 | Olivit | G09F 23/00 |
| | | | | | 362/116 |
| 6,276,088 | B1 | * | 8/2001 | Matthews | F21L 4/005 |
| | | | | | 362/110 |
| 6,283,610 | B1 | * | 9/2001 | Alajajian | F21L 4/04 |
| | | | | | 362/102 |
| 6,955,446 | B2 | * | 10/2005 | Uke | F21L 4/005 |
| | | | | | 362/201 |

* cited by examiner

*Primary Examiner* — Ali Alavi
(74) *Attorney, Agent, or Firm* — David M. Breiner; BrownWinick Law Firm

(57) ABSTRACT

Disclosed is a flashlight comprised of a bezel assembly, a case configured to enclose a first battery and a second battery in a side-by-side manner, and a tube extending from the bezel into the case assembly to at least partially enclose the first battery and provide a physical barrier between the first and second batteries.

17 Claims, 6 Drawing Sheets

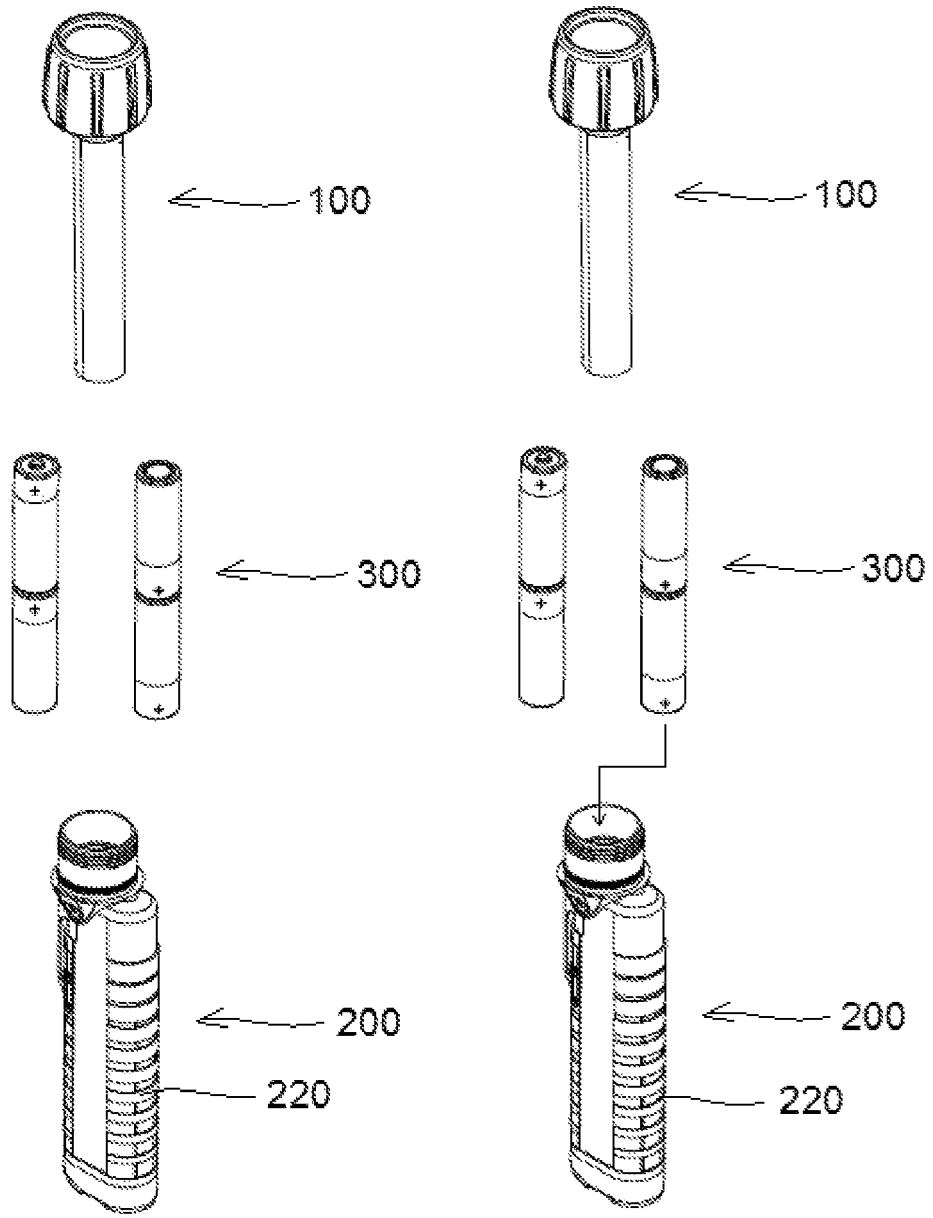

FLASHLIGHT WITH BATTERY SEPERATOR TUBE

BACKGROUND

1. Field

Example embodiments relate to a flashlight having a battery separator tube.

2. Description of the Prior Art

Conventional flashlights include a light source (for example, a light bulb or a light emitting diode) surrounded by a reflector configured to direct light out of the flashlight and into an environment. These flashlights generally house a plurality batteries to ensure the flashlights provide sufficient light for a sufficient time. Some of the batteries are provided end-to-end, others are provided in a side-to-side arrangement. In many of these cases, the batteries are dry cell batteries surrounded by insulation to protect the integrity of the insides of the battery.

SUMMARY

The inventor notes that batteries inside flashlights present a possible mode of failure. For example, dry-cell batteries housed in a flashlight might have defective insulation which may cause various elements of the battery to leak out into the flashlight. More specifically, many dry cell batteries include a paste made from $MnO_2$, $NH_4Cl$, and carbon. This paste is generally provided between an anode, for example, zinc, and a cathode, for example, graphite. The paste permits current to flow in the battery. Leakage of the paste could adversely affect the nearby batteries or electrical components of the flashlight leading to a failure of the flashlight. To minimize the impact of this type of defect, the inventor modified a conventional flashlight to include a battery separator tube which attaches to a bezel assembly of the flashlight. This battery tube separator separates batteries from each other to minimize the effects of the aforementioned defects. In addition, the inventor found that because the battery separator tube is connected to the bezel, heat generated from a light arranged near the bezel assembly is conducted through the battery separator tube and to the batteries thereby warming the batteries and allowing them to produce more power.

Disclosed is a flashlight comprised of a bezel assembly, a case configured to enclose a first battery and a second battery in a side-by-side manner, and a tube extending from the bezel into the case assembly to at least partially enclose the first battery and provide a physical barrier between the first and second batteries.

Disclosed is a flashlight comprising a bezel assembly, a case connected to the bezel assembly, a first plurality of batteries in a first region of the case, a second plurality of batteries in a second region of the case and being offset from the first plurality of batteries, and a battery separator tube connected to the bezel assembly so that the bezel assembly and the battery separator tube move as a single unit. In this nonlimiting example embodiment, the bezel assembly may have a light emitting diode to generate light, a printed circuit board providing electricity to the light emitting diode, and a reflector to reflect light from the light emitting diode. In this nonlimiting example embodiment, the first plurality of batteries may be arranged end to end and may have a first length and the second plurality of batteries may be arranged end to end and have a second length. In this nonlimiting example embodiment the battery separator tube may have a length about the same as the first length so that the first plurality of batteries fits inside the battery separator tube. In this way, the battery separator tube provides a physical separation between the first plurality of batteries and the second plurality of batteries.

BRIEF DESCRIPTION OF THE DRAWINGS

The disclosure will be better understood and when consideration is given to the drawings and the detailed description which follows. Such description makes reference to the annexed drawings wherein:

FIGS. 3A-3D are views of an assembly of the flashlight in accordance with an example of the invention.

DETAILED DESCRIPTION

Figure 1A:
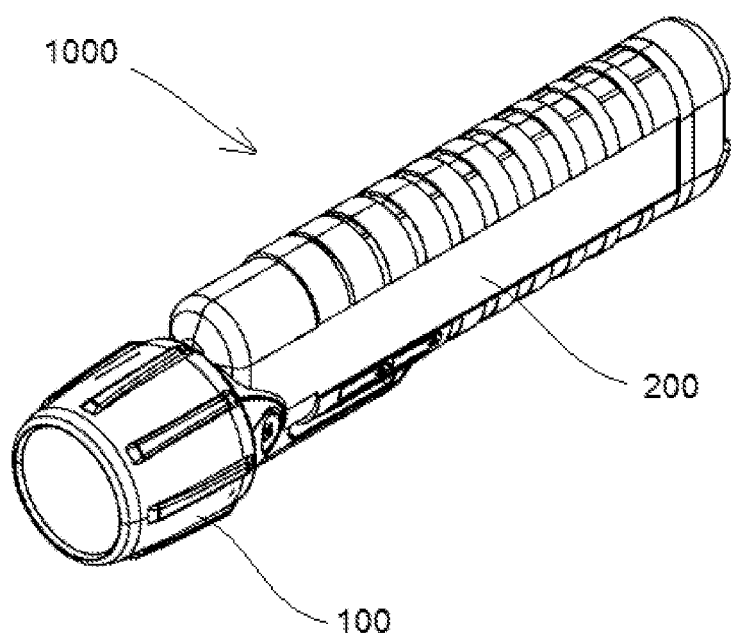
FIG. 1A is first perspective view of a flashlight in accordance with an example of the invention.
Figure 1B:
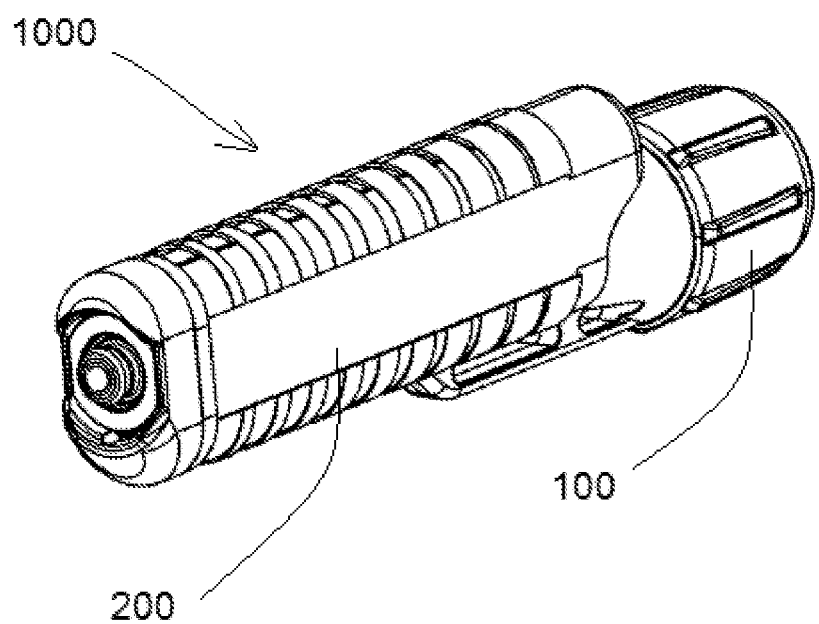
FIG. 1B is second perspective view of the flashlight in accordance with an example of the invention.
Figure 1C:
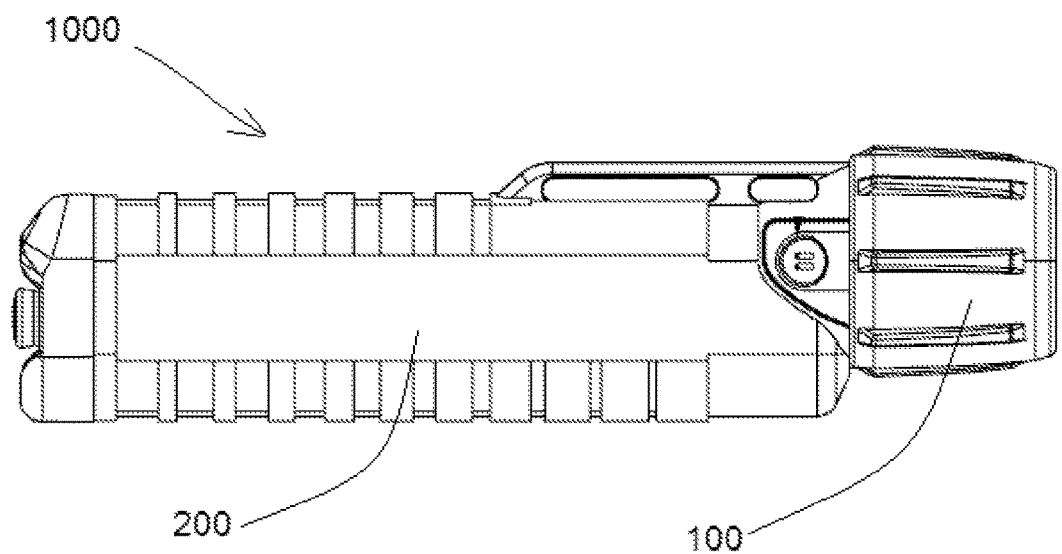
FIG. 1C is side view of the flashlight in accordance with an example of the invention.
Figure 1D:
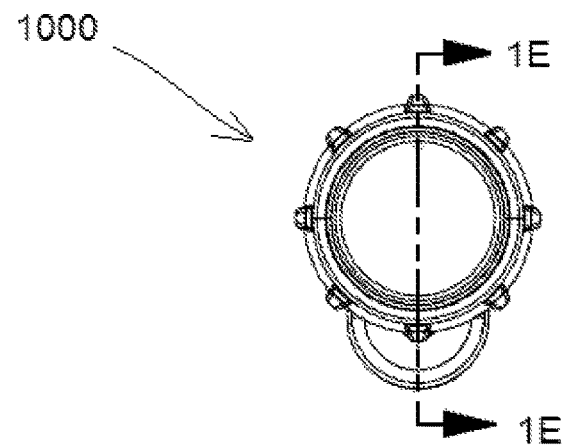
FIG. 1D is front view of the flashlight in accordance with an example of the invention.

Example embodiments will now be described more fully with reference to the accompanying drawings, in which example embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, the sizes of components may be exaggerated for clarity.

It will be understood that when an element or layer is referred to as being "on," "connected to," or "coupled to" another element or layer, it can be directly on, connected to, or coupled to the other element or layer or intervening elements or layers that may be present. In contrast, when an element is referred to as being "directly on," "directly connected to," or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers, and/or sections, these elements, components, regions, layers, and/or sections should not be limited by these terms. These terms are only used to distinguish one element, component, region, layer, and/or section from another elements, component, region, layer, and/or section. Thus, a first element component region, layer or section discussed below could be termed a second element, component, region, layer, or section without departing from the teachings of example embodiments.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the structure in use or operation in addition to the orientation depicted in the figures. For example, if the structure in the figures is turned over, elements described as "below" or "beneath" other elements or features would then be oriented "above" the other elements or features. Thus, the exemplary term "below" can encompass both an orientation of above and below. The structure may be otherwise oriented (rotated 90 degrees or at other orientations) and the spatially relative descriptors used herein interpreted accordingly.

Embodiments described herein will refer to plan views and/or cross-sectional views by way of ideal schematic views. Accordingly, the views may be modified depending on manufacturing technologies and/or tolerances. Therefore, example embodiments are not limited to those shown in the views, but include modifications in configurations formed on the basis of manufacturing process. Therefore, regions exemplified in the figures have schematic properties and shapes of regions shown in the figures exemplify specific shapes or regions of elements, and do not limit example embodiments.

The subject matter of example embodiments, as disclosed herein, is described with specificity to meet statutory requirements. However, the description itself is not intended to limit the scope of this patent. Rather, the inventors have contemplated that the claimed subject matter might also be embodied in other ways, to include different features or combinations of features similar to the ones described in this document, in conjunction with other technologies. Generally, example embodiments relate to a flashlight having a battery separator tube.

Figure 1E:
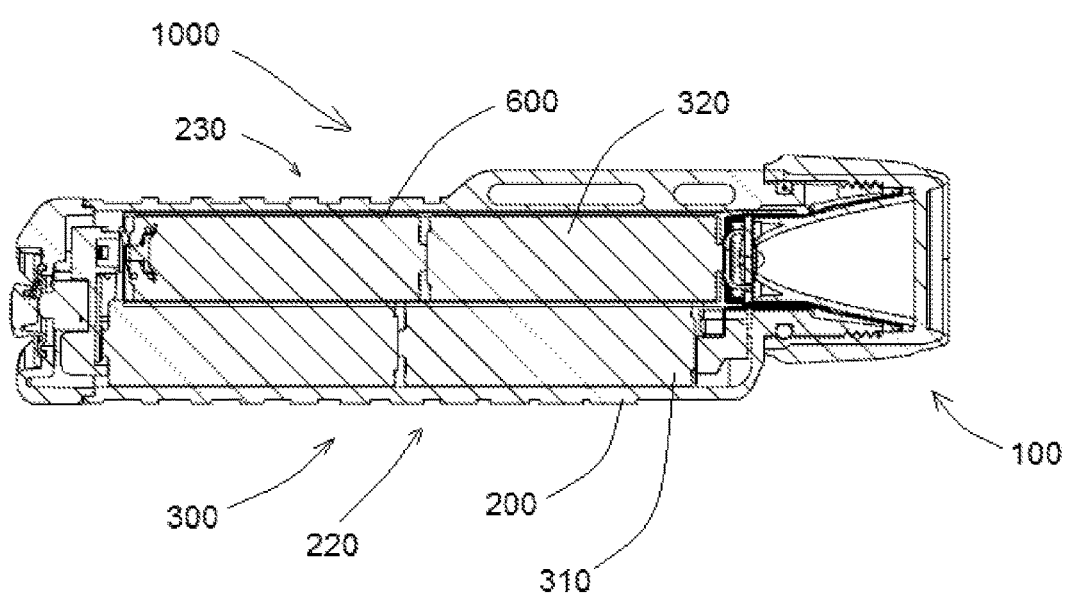
FIG. 1E is a cross-section view of the flashlight in accordance with an example of the invention.
Figure 1F:
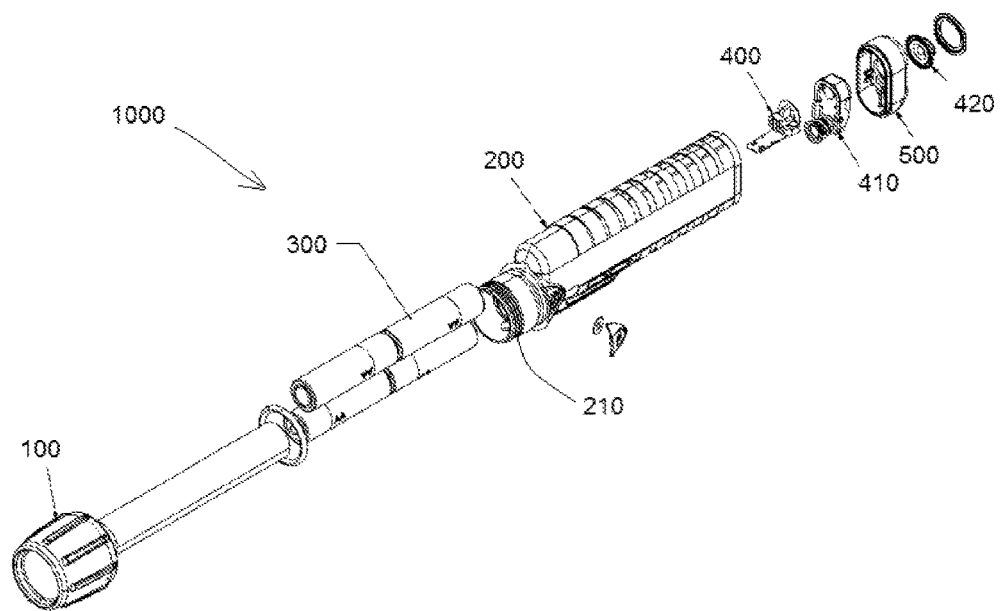
FIG. 1F is an exploded view of the flashlight in accordance with an example of the invention.

FIGS. 1A, 1B, 1C, and 1D illustrate a first perspective view of a flashlight 1000, a second perspective view of the flashlight 1000, a side view of the flashlight 1000, and a front view of the flashlight 1000 in accordance with an example of the invention. FIG. 1E illustrates a cross-section of the flashlight 1000 taken through line 1E-1E of FIG. 1D. FIG. 1F is an exploded view of the flashlight 1000 in accordance with an example of the invention.

Figure 2:
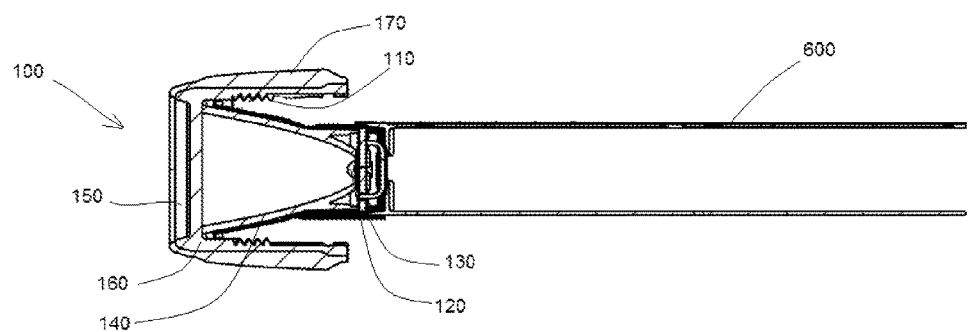
FIG. 2 is a view of a bezel with a separator tube attached thereto in accordance with an example of the invention.
Figure 3C:
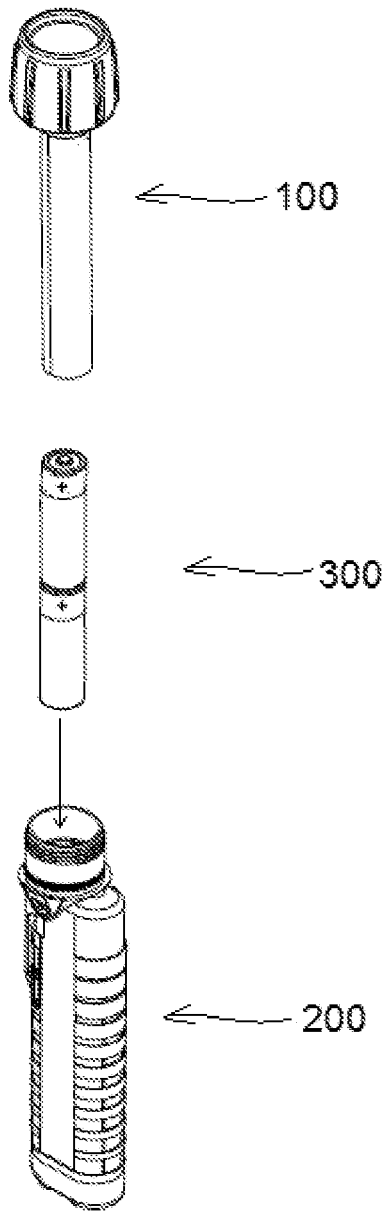
Figure 3D:
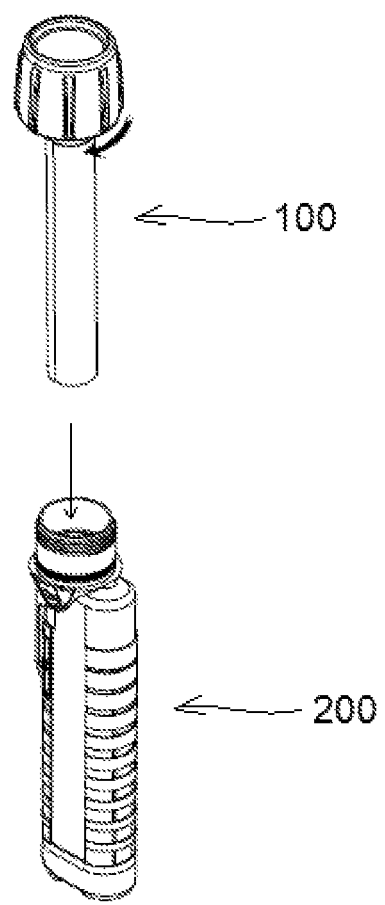

Referring to FIGS. 1A-1F the flashlight 1000 is comprised of a bezel assembly 100 and a case 200. The case 200 may include a threaded end 210 configured to engage threads 110 (see FIG. 2) of the bezel assembly 100. In this way, bezel assembly 100 may be connected to the case 200 by simply screwing the bezel assembly 100 onto the case 200 to interface the threads 110 of the bezel assembly 100 with the threads 210 of the case 200. It is understood this method of connecting the bezel 100 to the case 200 is not intended to limit the invention since the bezel assembly 100 may be connected to the case 200 by other well-known techniques such as using latches and/or clips. Furthermore, snap-on types of connections are also envisioned as being covered by the inventive concepts herein.

In example embodiments, the case 200 may enclose a power source 300 of the flashlight. In example embodiments, the power source 300 may be one or more dry cell batteries. In one particularly useful embodiment of the invention, the case 200 includes a lower area 220 into which a first plurality of batteries 310 may be inserted and an upper area 230 into which a second plurality of batteries 320 may be inserted. For example, in FIGS. 1A-F the case 200 is configured with a first region 220 to accept two dry-cell double A type batteries and a second region 230 configured to receive two more dry-cell double A type batteries. It is understood that case 200 illustrated in FIGS. 1A-1F is exemplary in nature since the case 200 may be configured with a first and second region 220 and 230 to receive only a single battery or more than two batteries.

In example embodiments, the flashlight 1000 may include various wires and circuits to route power through the flashlight 1000. For example, the flashlight 1000 may further include a first contact assembly 400 associated with a teeter-totter assembly 410 which are part of an electrical circuit that causes electricity to flow from the power source 300 to a light source 120. The electrical system may further include a push button 420 which allows a user to turn the flashlight 1000 on or off. These latter components may be held in place by and end cap 500 that may fit on an end of the case 200 and seal the end of the case 200. Because such wiring and elements are well known in the art, a detailed description thereof is omitted for the sake of brevity.

The bezel assembly 100 may be comprised of a light source 120 which may, for example, be a light bulb or a light emitting diode (LED). In the event the light source 120 is an LED, the bezel assembly 100 may further include a printed circuit board 130 supporting the LED and receiving power from the power source 300. Because such printed circuit boards 130 are well known in the art, a detailed description thereof is omitted for the sake of brevity.

In example embodiments, the bezel assembly 100 may further include a reflector 140 configured to reflect light from the light source 120 out a window 150 of the flashlight. The reflector 140 may comprise a curved reflective surface, for example, a circular, parabolic, or elliptical surface depending on a placement of the light source 120 within the bezel assembly 100. The bezel assembly 100 may further include a bezel 160 and a shroud 170 surrounding the bezel 160 to protect the bezel assembly 100 from shock.

As described earlier, the inventor identified battery insulation failure as a potential flaw in conventional flashlight designs. To minimize or reduce the effects of such a failure, the inventor has incorporated a battery separator tube 600 into his design. The battery separator tube 600 may, in one embodiment, resemble a hollow tube sized to allow a power source, for example, a dry-cell battery, to fit therein. In FIGS. 1A-1F the battery separator tube 600 is illustrated as a tube having an annular cross-section which may have an inner diameter slightly larger than the outer diameter of a conventional double A battery. In this way, the battery separator tube 600 may accommodate one or more double A batteries. However, the battery separator tube 600 may be designed to receive other size batteries such as, but not limited to, ½ AA, AAAA, AAA, A, B, C, Sub-C, D, F, N, A23, A27, Duplex, and 4SR44. As such, the separator tube 600 may be designed to have an annular cross-section and the inner diameter of the separator tube 600 may be about (or slightly larger than) 14 mm, 8.3 mm, 10.5 mm, 14.5 mm, 17 mm, 21.5 mm, 26.2 mm, 22.2 mm, 34.2 mm, 33 mm, 12 mm, 10.3 mm, 8 mm, 35.5 mm, 21.8 mm, or 13 mm to accommodate any of the aforementioned battery sizes. Of course, the battery separator tube 600 need not be designed to have an annular cross-section but may have another cross-section such as a polygonal or elliptical cross-section. Regardless, the battery separator tube 600 is designed to receive at least one battery and provide a physical barrier between adjacent batteries.

In example embodiments, the separator tube 600 is configured to receive one or more batteries. In the event the tube 600 receives a single battery, a length of the tube 600 may be about as long as a length of the single battery so that nearly all, or all, of the battery fits inside the battery separator tube 600. If, on the other hand, the battery separator tube 600 is intended to receive more than one battery in an end-to-end fashion, the length of the battery separator tube 600 may be about the length of the plurality of batteries. For example, if the battery separator tube 600 is intended to receive two double A batteries, a length of the separator tube 600 may be about 101 mm so that the two batteries may be completely, or nearly completely, inserted into the battery separator tube 600. On the other hand, if the battery separator tube 600 were configured to receive three double A batteries, a length of the separator tube 600 may be about 151 mm to accommodate all three double A batteries.

In example embodiments, the battery separator tube 600 may separate batteries that arranged adjacent to one another, rather than batteries that are arranged end to end. For example, the nonlimiting example illustrated in FIG. 1E illustrates a battery separator tube 600 separating a first plurality of batteries 310 from a second plurality of batteries 320. As such, in the event one of the pluralities of batteries experiences an insulation failure, the other pluralities of batteries are protected from the contents thereof via the battery separator tube 600. In other words, the battery separator tube 600 provides a physical barrier between adjacently arranged batteries so that contents of one of the pluralities of batteries cannot harm the other plurality of batteries in the event of an insulation breach. In this application it is understood that a physical barrier is not meant to imply an electrical barrier. For example, while the first plurality of batteries 310 is physically separated from the second plurality of batteries 320 by the battery separator tube 600, they may still be electrically connected by wiring elements of the flashlight 1000, for example, by contacts or wires that may be present in the flashlight 1000.

In example embodiments, the battery separator tube 600 may be attached to the bezel assembly 100. For example, a first end of the battery separator tube 600 may be connected at or near the light source 120. In the conventional art, it is well known that some light sources, for example, light emitting diodes, generate a lot of heat. This heat is normally conducted throughout the flashlight and dissipated from the flashlight by conduction, convention, or radiation. However, in the embodiment of FIGS. 1A-1F, the battery separator tube 600 having an end arranged near the light source may conduct the heat from the light source 120 along a length of the battery separator tube 600 and to the pluralities of batteries. This may warm the batteries allowing them to produce more power.

In example embodiments the battery separator tube 600 may be comprised of a plastic material. In the alternative, the battery separator tube 600 may be made from a more thermally conductive material, for example, brass, to better conduct heat from the light source 120 to the batteries in the case 200. In yet another alternative, the battery separator tube 600 may be made comprised of several materials, for example, a thermally conductive material having an insulation material on the inside and outside thereof.

FIGS. 3A-3D illustrate a manner in which power sources 300 of the flashlight 1000 are installed. As shown FIG. 3A, a case 200 and bezel assembly 100 of the flashlight 1000 are apart as are the power sources 300 which, in this nonlimiting example, include four double A batteries. In example embodiments, a user may simply insert two of the batteries into the case 200 so that the two batteries reside in the first region 220 of the case 200. The user may then insert the remaining batteries into the second region 230 of the case 200. The user may then move the bezel assembly 100 with the separator tube 600 attached thereto towards the case 200 so that the battery separator tube 600 inserts into the case 200 and encloses the batteries in the second region 230 of the case 200. The bezel assembly 100 may then be screwed onto the case 200 by engaging the threads 110 of the bezel assembly 100 with the threads 210 of the case 200 and rotating the bezel assembly 100 with respect to the case 200. Of course, the power sources 300 may be removed by simply reversing the above operations. As is evident from the above nonlimiting example embodiment, the battery separator tube 600 and the bezel assembly 100 may be connected to each other so that as the bezel assembly 100 is separated from the case 200, the battery separator tube 600 is drawn out of the case 200.

The inventor contemplates the inventive concepts disclosed herein cover several embodiments not specifically described in this application. For example, another embodiment of the inventor's invention has a separator tube removably connected to a bezel assembly. In yet another embodiment, the separator tube is provided separate from the bezel assembly but sized so that when it is inserted into the case of a flashlight it contacts the bezel assembly when the bezel assembly is attached to the case. Of course, the specific embodiments of various features disclosed thus far are considered to be only exemplary. For example, the bezel assembly may include additional or alternative features such as elements that form a downlight. As yet another example, rather than having a push button arranged at an end of the flashlight, the push button may be arranged at a side of the case 200.

The foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that which falls within the scope of the claims.

What is claimed is:
1. A flashlight comprised of:
a bezel assembly;
a case configured to enclose a first battery and a second battery in a side-by-side manner; and
a tube extending from the bezel into the case assembly to at least partially enclose the first battery and provide a physical barrier between the first and second batteries.
2. The flashlight of claim 1, wherein the bezel assembly includes a light source and the tube is configured to conduct heat from the light source to the first and second batteries to warm the first and second batteries to increase their power.
3. The flashlight of claim 2, wherein the light source is a light emitting diode.
4. The flashlight of claim 1, wherein a length of the tube is at least as long as a length of the first battery.
5. The flashlight of claim 1, wherein the tube is attached to the bezel assembly so the tube and the bezel assembly move as a single unit.
6. The flashlight of claim 1, wherein the tube is attached to the bezel assembly so that as the bezel assembly is disconnected from the case the tube is pulled out of the case.
7. The flashlight of claim 1, wherein the tube is comprised of plastic.
8. The flashlight of claim 1, wherein the tube is comprised of a thermally conductive material.
9. The flashlight of claim 8, wherein the thermally conductive material is brass.
10. The flashlight of claim 9, wherein the brass tube has insulation on an inside and outside surface.

11. The flashlight of claim 1, wherein the tube is configured to prevent an element of the second battery from physically contacting the first battery.

12. A flashlight comprising:
- a bezel assembly having a light emitting diode to generate light, a printed circuit board providing electricity to the light emitting diode, and a reflector to reflect light from the light emitting diode;
- a case connected to the bezel assembly;
- a first plurality of batteries in a first region of the case, the first plurality of batteries being arranged end to end and having a first length;
- a second plurality of batteries in a second region of the case and being offset from the first plurality of batteries, the second plurality of batteries being arranged end to end and having a second length; and
- a battery separator tube connected to the bezel assembly so that the bezel assembly and the battery separator tube move as a single unit, the battery separator tube having a length about the same as the first length so that the first plurality of batteries fits inside the battery separator tube and the battery separator tube provides a physical separation between the first plurality of batteries and the second plurality of batteries.

13. The flashlight of claim 12, wherein the battery separator tube is configured to conduct heat from the light emitting diode to the first and second pluralities of batteries.

14. The flashlight of claim 13, wherein the battery separator tube is comprised of plastic.

15. The flashlight of claim 13, wherein the battery separator tube is comprised of conductive material.

16. The flashlight of claim 15, wherein the conductive material is brass.

17. The flashlight of claim 16, wherein the brass is covered by an insulation material.

\* \* \* \* \*